C. ROMATI.
FASTENING FOR ATTACHING BRACES AND FOR OTHER PURPOSES.
APPLICATION FILED JAN. 10, 1921.

1,396,344.

Patented Nov. 8, 1921.

Inventor.
Cesare Romati
By ........... Atty.

UNITED STATES PATENT OFFICE.

CESARE ROMATI, OF TURIN, ITALY.

FASTENING FOR ATTACHING BRACES AND FOR OTHER PURPOSES.

1,396,344.         Specification of Letters Patent.         Patented Nov. 8, 1921.

Application filed January 10, 1921. Serial No. 436,283.

*To all whom it may concern:*

Be it known that I, CESARE ROMATI, a subject of the King of Italy, residing at Turin, Italy, have invented certain new and useful Improvements in and Relating to Fastenings to be Applied More Particularly to Trousers for Attaching Braces and for other Purposes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object a removable fastening provided with a button, to be more particularly applied to trousers for attaching braces and for other purposes.

A fastening according to the present invention comprises a back plate and a front counter-plate intended to be fixed against the edge of the cloth for instance at the upper band of the trousers and on both sides thereof. The back plate is provided with two projections passing through the cloth into suitable openings of the counter-plate; one of the said projections is screw-threaded and adapted to receive a pressing button serving for the attachment of the braces, while the other projection is ended by a head having the shape of a mushroom. The fastening comprises in addition a fixing plate slidingly mounted on the counter-plate and engaging together with the latter in an annular groove of the pressing button, the said fixing plate being provided with an eye-shaped opening intended to engage below the mushroom-shaped head of the projection of the back plate for the purpose of securing the whole into position.

One mode of construction of a fastening according to the present invention is illustrated by way of example in the accompanying drawings in which.

Figure 1:
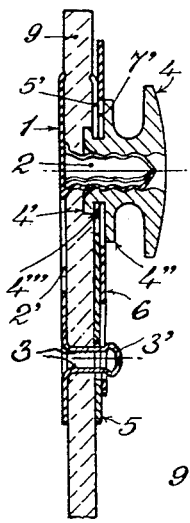
Figures 1 and 2 show respectively the fastening in a transverse section and front elevation with the fixing plate in its opening position.
Figure 2:
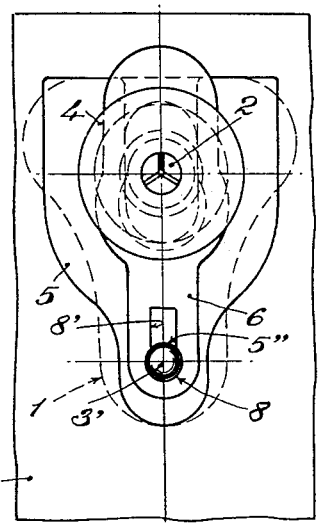
Figure 5:
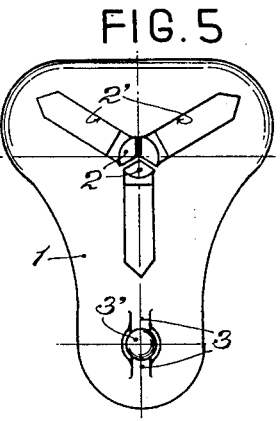
Figs. 5, 6 and 7 show in detail a front vertical elevation respectively the back plate, the counter-plate and the fixing plate.
Figure 3:
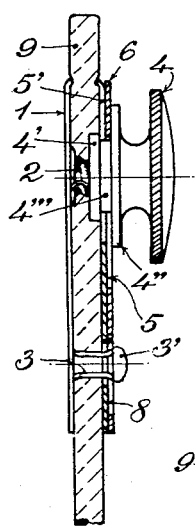
Figs. 3 and 4 show the fastening in a similar position to that of Figs. 1 and 2, but with the fixing plate in its closing position.
Figure 4:
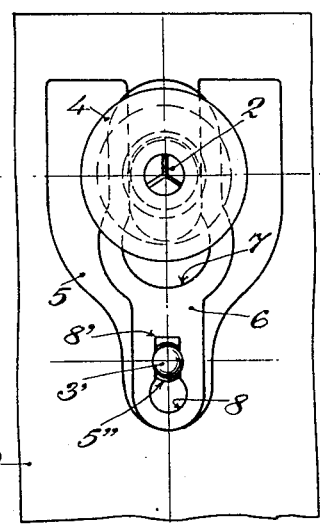
Figure 6:
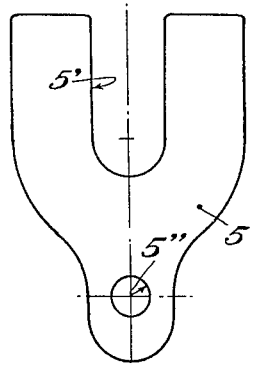
Figure 7:
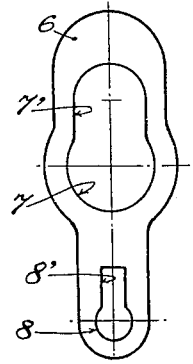

Referring to the drawings, 1 is a back plate provided with a screwthreaded projection 2 and with a projection constituted by two lateral tongues 3 ended by a convex head 3' having the shape of a mushroom. A pressing button 4 is screwed on the screw-threaded projection 2, which button serves for the attachment of the braces and is provided with an annular groove 4''' in its extension 4' situated behind the pressing shoulder 4''. A counter-plate 5 is provided with an opening 5' which is elongated and open at the upper part for leaving free passage to the button 4 engaging in the said opening with the annular groove 4'''; moreover, the said counter-plate is provided with a hole 5'' at its lower part for the free passage of the projection 3, 3'. The fixing plate 6 which is mounted so as to be capable of sliding on the counter-plate 5 has two eye-shaped openings 7, 7' and 8, 8'. The fastening is mounted as follows:

The back plate 1 is placed where desired near to the edge of the cloth 9, (see Figs. 1 and 2) the latter constituting for instance the band of the trousers, the projections 2 and 3, 3' of the back plate being inserted through suitable holes made in the cloth 9. On the other hand the back extension 4' of the button is inserted through the opening 7 of the fixing plate 6 and the portion 7' of the said opening is engaged in the groove 4''' of the button in which the window 5' of the counter-plate 5 is also engaged, the said counter-plate 5 being thus placed below the fixed plate 6. The button 4 is then partially screwed on the screw-threaded projection 2 and at the same time the projection 3, 3' is inserted through the hole 5'' of 5 and through the part 8 of the opening 8, 8' of the fixing plate 6. Both plates 5 and 6 are thus juxtaposed to the back plate as shown in Figs. 1 and 2. In order to fix the whole in position in a stable manner the fixing plate 6 is slid toward the bottom as shown in Figs. 3 and 4 in such a manner that the lateral tongues 3 of the projection 3, 3' shall engage in the narrow part 8' of the opening 8, 8' of the fixing plate. 6 which is thus fixed below the head 3' of the projection 3, 3'; lastly the button 4 is screwed right down on the screw-threaded projection 2. The plate 1 and the counter-plate 5 are then strongly pressed from opposite sides against the cloth 9 in which they partially penetrate with their slightly curved edges. By this arrangement the pull exerted on the button 4 through the intermediary of the braces attached thereto is uniformly distributed along the whole surface of the cloth which is inclosed between 1 and 5 so that there is no possibility of tearing. Moreover, the plate and the counter-plate serve for preventing any creasing of the edge of the cloth or of the band of the trousers at the place where the attachment is effected.

The taking to pieces of the fastening is effected in a very easy manner by unscrewing the button 4 and by sliding upward the fixing plate 6.

In the above description, the application of the fastening to the band of the trousers for the purpose of attaching the braces, has been more particularly considered but it is obvious that the said fastening may serve for many other applications.

In the mode of construction shown in the drawing the screw-threaded projection 2 of the back plate is formed by three tongues out from the plate itself where the openings 2' will be formed. The said tongues are afterward embossed and stamped in such a manner as to form the desired screwthread and then bent at the upper part perpendicularly to the plate 1 in such a manner as to form a kind of hollow and screwthreaded pivot 2 serving for the screwing-up of the button 4. The projection 3, 3' is obtained by a stamping of the same material from which the plate 1 is formed. Although the above construction is very simple and economical nothing prevents the projections 2 and 3, 3' being separately constructed in the form of pivots which are afterward fixed to the plate 1 by riveting for instance.

Having now particularly described and ascertained the nature of my said invention and in what manner the same is to be performed, I declare that what I claim is:—

1. A removable fastening with button, to be applied more particularly to trousers for attaching braces, and for other purposes, characterized by a back plate and a front counter-plate intended to be fixed in proximity of the edge of the cloth or band of the trousers on both sides thereof, the back plate being provided with two projections passing through the cloth into suitable openings of the counter-plate, one of the said projections being screwthreaded and adapted to receive a pressing button serving for the attachment of the braces, while the other projection is ended by a mushroom-shaped head, a fixing plate slidingly mounted on the counter plate and engaging together with the latter in an annular groove of the pressing button, the said fixing plate being provided with an eye-shaped opening intended to engage below the mushroom-shaped head of the projection of the back plate for the purpose of fixing the whole into position.

2. A removable fastening of the character described comprising a back plate having projections for passage through a base, a counter plate having openings to receive the projections, a button adapted to be secured to one of said projections, a head formed on the other projection, a fixing plate slidably mounted on the counter plate and engaging with the counter plate, an annular groove in the button, said fixing plate being provided with an eye-shaped opening for engaging the headed projection of the back plate, for the purpose specified.

In testimony that I claim the foregoing as my invention, I have signed my name.

CESARE ROMATI.